US008664528B2

(12) United States Patent
Ooishi et al.

(10) Patent No.: US 8,664,528 B2

(45) Date of Patent: Mar. 4, 2014

(54) WIRE HARNESS AND METHOD FOR MAKING THE SAME

(75) Inventors: Madoka Ooishi, Makinohara (JP); Tetsuro Ide, Makinohara (JP)

(73) Assignee: Yazaki Corporation, Tokyo (JP)

(*) Notice: Subject to any disclaimer, the term of this patent is extended or adjusted under 35 U.S.C. 154(b) by 123 days.

(21) Appl. No.: 13/326,608

(22) Filed: Dec. 15, 2011

(65) Prior Publication Data

US 2012/0175166 A1 Jul. 12, 2012

(30) Foreign Application Priority Data

Jan. 11, 2011 (JP) ................................ 2011-002930
Mar. 17, 2011 (JP) ................................ 2011-059424

(51) Int. Cl.
*H02G 3/04* (2006.01)

(52) U.S. Cl.
USPC ...... 174/72 A; 174/77 R; 174/74 R; 439/587; 439/589

(58) Field of Classification Search
USPC .............. 174/72 A, 77 R, 74 R; 439/587, 589
See application file for complete search history.

(56) References Cited

U.S. PATENT DOCUMENTS

| | | | | |
|---|---|---|---|---|
| 6,814,617 | B2 * | 11/2004 | Oota et al. | 439/589 |
| 7,004,789 | B2 * | 2/2006 | Kameyama et al. | 439/587 |
| 8,007,302 | B2 * | 8/2011 | Kleinke | 439/275 |

FOREIGN PATENT DOCUMENTS

JP 2005-339850 A 12/2005

* cited by examiner

*Primary Examiner* — Dhirubhai R Patel

(74) *Attorney, Agent, or Firm* — Edwards Wildman Palmer LLP

(57) ABSTRACT

The present invention is to provide a wire harness capable of improving productivity and reducing cost as well as enhancing waterproof performance to secure reliability, and a method for manufacturing the wire harness, The wire harness includes an electronic wire having a core wire and a covering part covering the core wire, a male terminal attached to the core wire exposed out of the covering part of the electric wire, a housing attached to the covering part and formed to lay the male terminal therein, and a ring-shaped waterproof member disposed between the housing and the covering part, filling a gap therebetween, and made of soft resin.

20 Claims, 8 Drawing Sheets

WIRE HARNESS AND METHOD FOR MAKING THE SAME

CROSS REFERENCE TO RELATED APPLICATIONS

This application is on the basis of Japanese Patent Application NO. 2011-059424, the contents of which are hereby incorporated by reference.

BACKGROUND OF THE INVENTION

1. Field of the Invention

The present invention relates to, e.g., a wire harness including an electric wire harness having a core wire and a covering part covering the core wire, a terminal fixture attached to the core wire, and a housing accommodating the terminal fixture, and a method for manufacturing the wire harness.

2. Description of the Related Art

An automobile as a mobile body has recently been designed to reduce its weight to improve fuel consumption by virtue of core wire of an electric wire disposed in a wire harness being composed of aluminum, which is employed for supplying electric devices such various lamps or motors to be installed with power from power source such a battery. To the core wire of the electric wire is attached a terminal fixture made of metal, copper or copper ally, which is different from the core wire.

Since the core wire made of aluminum and the terminal fixture made of copper or copper alloy attached to the terminal fixture are made of different metals, a local cell is formed, making the core wire corrode when a contact portion of the core wire and the terminal fixture is watered, thus posing a drawback of incurring electric corrosion.

Technology for resolving such the drawback has been proposed in PTL 1. A conventional wire harness 101 described in PTL 1 shown in FIG. 10 is provided with a core wire 105 made of aluminum, an electric wire 102 having a covering part 106 covering the core wire 105, and a terminal fixture 107 attached to an end of the electric wire 102 and formed by swaging tubelar pipe member made of copper or copper alloy.

The following describes how the above-mentioned conventional wire harness 101 is assembled. Firstly, as shown in FIG. 10A, a terminal 108 is formed by one end of the pipe member being flatly swaged. Secondly, after waterproof sealant 101a is filled inside the pipe member, a core wire 105 exposed out of the covering part 106 of the electric wire 102 is inserted from the other end of the pipe member, and the core wire 105 is positioned at a middle of the pipe member. Then, the middle of the pipe member and the core wire 105, as shown in FIG. 10B, are swaged together to connect with each other, forming a connection 109. The terminal fixture 107 is thus formed. Then, as shown in FIG. 10C, the waterproof sealant 101a is filled inside the terminal fixture 107 so as to fill a gap between the terminal fixture 107 and the covering part. The conventional wire harness 101 has thus been assembled.

[Patent Literature 1] Japanese Patent Application Laid-Open Publication No. 2005-339,850

However, there has been a drawback to be mentioned below in the above-mentioned conventional wire harness 101. I.e. since with the wire harness 101, after the terminal fixture 108 is formed, the middle of the pipe member and the core wire 105 has been swaged together to form the connection 109, forming the terminal fixture 107, the terminal 108 and the connection 109 have been manufactured in respective processes, resulting in prolongment of required time for manufacturing the terminal fixture 107 so as to likely reduce productivity of the wire harness 101. In addition, with the conventional wire harness 101, after the waterproof sealant 101a has been filled inside the pipe member, and the middle of the pipe member and the core wire 105 have been swaged together to form the connection 109, forming the terminal fixture 107, the waterproof sealant 101a has been required to fill inside the terminal fixture 107, it has therefore been required to employ the waterproof sealant 101a in various processes multiple times, resulting in requirement of work for waterproof processing for the wire harness 101 and prolongment of required time for manufacturing the terminal fixture 107, so as to likely reduce productivity of the wire harness 101. Furthermore, since it is not possible to confirm whether the waterproof sealant 101a has been filled between the terminal fixture 107 and the covering part 106 without any gap, it has been likely that water has infiltrated between the core wire 105 and the terminal fixture 107, resulting in watering a connection portion therebetween. This has caused a problem of not securing reliability of the wire harness 101.

Although it has been made possible not incur corrosion in the conventional wire harness 101 if the core wire 105 is made of the same copper or copper alloy as the terminal fixture 107, it has been remained likely to water the connection portion between the core wire 105 and the terminal fixture 107.

Accordingly, an object of the present invention is to resolve the above-mentioned drawback. Namely, it is made possible to provide a wire harness capable of improving productivity and reducing cost, as well as enhancing waterproof performance to secure reliability, and a method for manufacturing the wire harness.

SUMMARY OF THE INVENTION

According to the present invention recited in claim 1, there is provided a wire harness, comprising: an electronic wire having a core wire and a covering part covering the core wire; a terminal fixture attached to the core wire exposed out of the covering part of the electric wire; a housing attached to the covering part and formed to lay the terminal fixture therein; and a waterproof member formed in a ring shape between the housing and the covering part so as to fill a gap therebetween, and made of soft resin.

According to the present invention recited in claim 2, there is provided the wire harness recited in claim 1 characterized by the fact that the core wire is made of aluminum.

According to the present invention recited in claim 3, there is provided the wire harness recited in claim 1 characterized by the fact that the core wire is made of copper.

According to the present invention recited in claim 4, there is provided a method for manufacturing the wire harness in any one of claims 1 to 3, characterized by comprising the steps of: attaching the core wire exposed out of the covering part of the electric wire to the terminal fixture; attaching the waterproof member to an outside of the covering part with the core wire being attached to the terminal fixture; attaching the housing to an outside of the waterproof member with the waterproof member being attached to the outside of the covering part.

According to the present invention recited in claim 5, there is provided the method for manufacturing the wire harness recited in claim 4, characterized by the fact that the terminal fixture includes a terminal connected with a mating terminal fixture, and a connection part extending to the terminal and connected with the core wire, the method further comprising: forming the terminal and the connection part together by press working with the core wire inside a cylindrical member made of conductive metal.

According to the present invention recited in claim 6, there is provided the method for manufacturing the wire harness recited in claim 4, characterized by the fact that the terminal fixture includes a terminal connected with a mating terminal fixture, and a connection part extending to the terminal and connected with the core wire, the method further comprising: placing the core wire on a conductive metal plate; folding the metal plate so as to sandwich the core wire; and forming the terminal and the connection part together by press-working of the sandwiched metal plate.

According to the present invention recited in claim 7, there is the method for manufacturing the wire harness recited in any one of claims 4 to 6, characterized by the fact that the waterproof member is formed integral with the covering part by injection molding.

According to the present invention recited in claim 8, there is the method for manufacturing the wire harness recited in any one of claims 4 to 7, characterized by the fact that the housing is formed by injection molding integral with the electric wire and the waterproof member attached to the covering part of the electric wire.

Advantageous Effects of Invention

According to the invention recited in claims 1 and 4, since a wire harness comprises an electronic wire having a core wire and a covering part covering the core wire, a terminal fixture attached to the core wire exposed out of the covering part of the electric wire, a housing attached to the covering part and formed to lay the terminal fixture therein, and a waterproof member formed in a ring shape between the housing and the covering part so as to fill a gap therebetween, and made of soft resin, it is made possible that the connection portion between the core wire and the terminal fixture without the conventional waterproof sealant is waterproofed, resulting in improvement of productivity, and reduction of cost, as well as provision of the wire harness capable of securing reliability by enhancing the waterproof performance and the method for manufacturing the wire harness.

According to the invention recited in claim 2, since the core wire is made of aluminum, it is made possible to reduce weight of the wire harness. In addition, since it is made possible that the connection portion between the core wire and the terminal fixture is waterproofed, it is made possible to contain inducement of corrosion in the core wire.

According to the invention recited in claim 3, since the waterproof member is disposed, it is made possible that without the conventional waterproof sealant, the connection portion between the core wire and the terminal fixture is waterproofed, resulting in improvement of productivity and reduction of cost, as well as provision of the wire harness capable of securing reliability by enhancing the waterproof performance.

According to the invention recited in claim 5, since the terminal fixture includes a terminal connected with a mating terminal fixture, and a connection part extending to the terminal and connected with the core wire, the method further comprising: forming the terminal and the connection part together by press working with the core wire inside a cylindrical member made of conductive metal, it is made possible to form the terminal and the connection portion together without forming them separately, resulting in improvement of productivity and reduction of cost.

According to the invention recited in claim 6, since the terminal fixture includes a terminal connected with a mating terminal fixture, and a connection part extending to the terminal and connected with the core wire, the method further comprising placing the core wire on a conductive metal plate, folding the metal plate so as to sandwich the core wire, and forming the terminal and the connection part together by press-working of the sandwiched metal plate, it is made possible to form the terminal and the connection portion together without forming them separately, resulting in improvement of productivity and reduction of cost.

According to the invention recited in claim 7, since the waterproof member is formed integral with the covering part by injection molding, it is made possible to reduce work for attaching the waterproof sealant to outside the covering part, resulting in improvement of productivity and reduction of cost as well as further enhancement of the waterproof performance on account of maintaining waterproofed without any gap between the waterproof sealant and the covering part.

Furthermore, in the manufacturing process for the wire harness, since the waterproof member and the electric wire is separately provided, the waterproof member and the electric wire, when attaching the waterproof member to the electric wire, are given respective part numbers so as to be separately managed, it is made possible not to control inventory of the waterproof member by giving only one part number to the electric wire because of the waterproof member being formed integral with the covering part by injection molding, and enable production of the waterproof member according to its demand so as to eliminate unnecessary inventory and dead storage, resulting in further reduction of cost. Furthermore, since the waterproof member is formed integral with the covering part of the electric wire by injection molding, it is made possible to reduce logistic cost for transporting the waterproof member from components factory to assembly factory manufacturing the wire harness, resulting in further reduction of cost.

According to the invention recited in claim 8, since the housing is formed by injection molding integral with the electric wire and the waterproof member attached to the covering part of the electric wire, it is made possible to reduce work for attaching the housing to the electric wire and the waterproof member attached to the electric wire, as a result of which allows further reduction of cost and enhances the waterproof performance on account of maintaining waterproofed without any gap between the electric wire and the waterproof member attached to the electric wire to lead further improvement of waterproof performance.

Furthermore, in the manufacturing process for the wire harness, since the housing, the electric wire, and the waterproof member attached to the electric wire are separately provided, and the housing, the electric wire, and the waterproof member attached to the electric wire, when attaching the housing to the electric wire and the waterproof member attached to the electric wire, are given respective part numbers so as to be separately managed, it is made possible not to control inventory of the waterproof member by giving only one part number to the housing attached to the electric wire and the waterproof member attached to the electric wire because the housing is formed integral with the electric wire and the waterproof member attached to the electric wire by injection molding, and enable production of the waterproof member according to its demand so as to eliminate unnecessary inventory and dead storage, resulting in further reduction of cost. Furthermore, it is made possible to reduce logistic cost for transporting the housing from components factory to assembly factory manufacturing the wire harness, resulting in further reduction of cost.

BRIEF DESCRIPTION OF THE DRAWINGS

FIG. 80 is a perspective view illustrating a state that the pair of cavities is separated from each other;

DETAILED DESCRIPTION OF THE PREFERRED EMBODIMENTS

Hereafter, a wire harness according to the present invention will be explained with reference to FIGS. 1 to 9.

Figure 1:
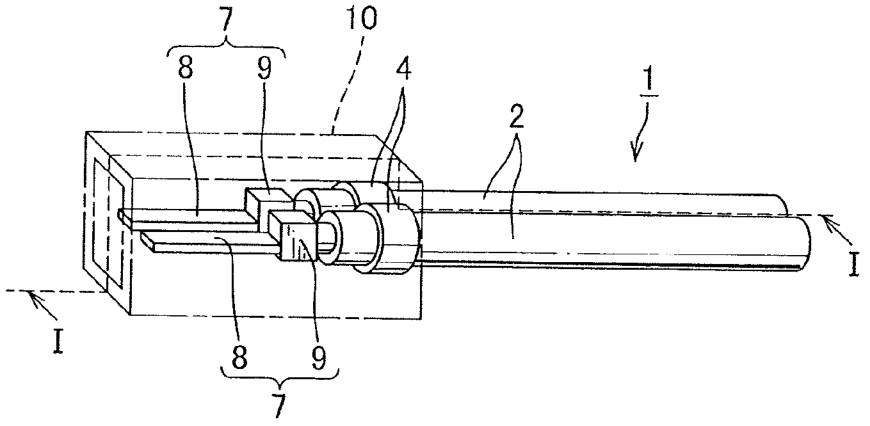
FIG. 1 is a perspective view illustrating one embodiment of a wire harness according to the present invention.
Figure 2:
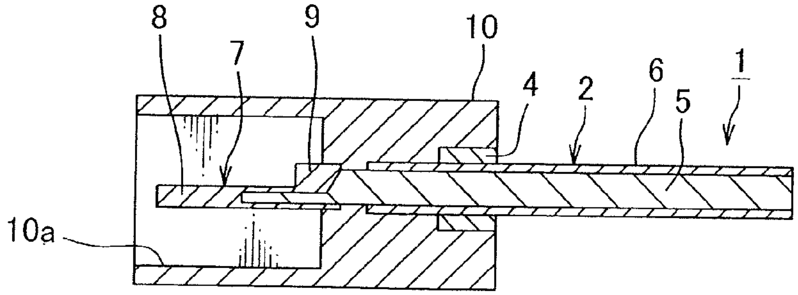
FIG. 2 is a cross-sectional view along I to I in FIG. 1.

The above-mentioned wire harness, as shown in FIGS. 1 to 2, includes: an aluminum electric wire 2 as an electric wire having a core wire 5 into which a plurality of elemental wires made of aluminum are twisted to be formed, and a covering part 6 covering the core wire 5; connector 3 having a male terminal 7 as a terminal fixture attached to the aluminum electric wire 2, and a housing 10 laying the male terminal 7 therein; and a waterproof member 4 disposed between the aluminum electric wire 2 and the housing 10.

The core wire 5 may be made of aluminum alloy. The core wire 5 may also be made from single element wire. The above covering part 6 is composed of synthetic resin such as polyvinylchloride, PVC, or polyolefin (PE or PP). Because the covering part 6 covers the core wire 5, a circumference of the aluminum electric wire composes a circumference of the covering part.

The connector 3 is adapted to engage a mating connector 15 disposed in the other wire harness 11 mentioned below.

The male terminal 7 is obtained by inserting the core wire 5 exposed out of the covering part of the aluminum electric wire 2 into a pipe member 7' made of copper or copper alloy as tubelar member, and forming by press working while the core wire 5 is positioned inside the pipe member 7'. The male terminal 7 is provided with a terminal 8 to be connected with a female terminal mentioned below disposed in the mating connector 15, and a connection part 9 extending to the terminal 8 to be connected with the core wire 5.

The terminal part 8, as shown in FIG. 2, extends along a longitudinal direction of the aluminum electric wire 2. The terminal part 8 is also formed in a thinner plate shape than the connection part 9 in a direction perpendicular to the longitudinal direction.

The housing 10 is made of isolating resin. The housing 10 is formed in a rectangle shape. The housing 10, as shown in FIG. 2, is also provided with a receiving part 10*a* receiving a housing 19 of a mating connector 15 mentioned below. The receiving part 10*a* is formed concave from outside a side of the housing 10 away from the aluminum electric wire 2 along the longitudinal direction. In the housing 10, a waterproof member 4 attached to the aluminum electric wire 2, the core wire exposed out of the covering part 6 of the aluminum electric wire 2, and a part of the connection part 9 connected with the core wire 5 are laid. Namely, the male terminal 7 is laid in the housing 10. Inside the receiving part 10*a*, a terminal 8 and the other of connection part 9 are also accommodated. Namely, the terminal 8 and the other of connection part 9 are exposed.

The waterproof member 4 is composed of soft resin such as elastomer. The waterproof member 4 is also ring-shaped. Further the waterproof member 4 is attached to a circumference of the aluminum electric wire 2 (i.e., covering part 6). The waterproof member 4 is disposed between the housing 10 and the aluminum electric wire 2, which fills a gap therebetween and keeps waterproofed therebetween.

Figure 3:
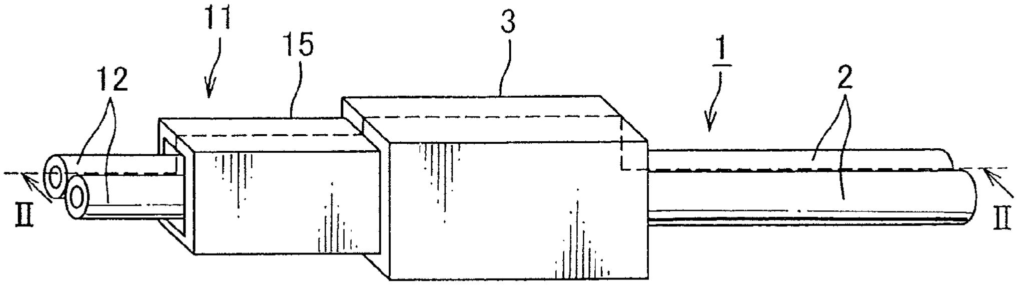
FIG. 3 is a perspective view illustrating a state that a connector and a mating connector composing the wire harness shown in FIG. 1 are engaged with each other.
Figure 4:
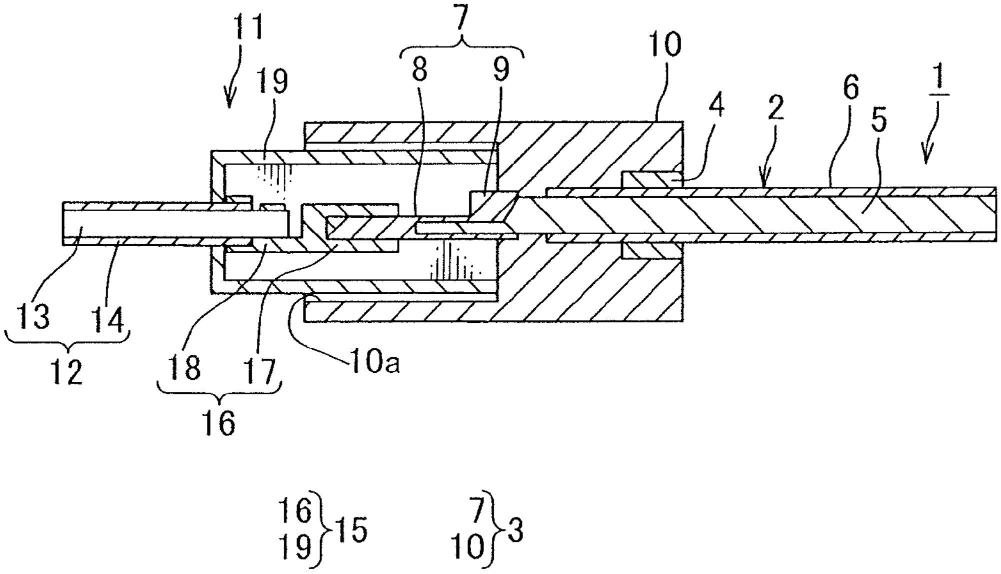
FIG. 4 is a cross-sectional view along II to II in FIG. 3.

The other wire harness 11, as shown in FIG. 3 and FIG. 4, is provided with an electric wire 12 having a conductive core wire 13 into which a plurality of element wires is twisted to be formed and a covering part 14 covering the core wire 13, and a mating connector 15 attached to the electric wire 12.

The core wire 13 may also be made from a single element wire. The core wire 13 may as well be composed of conductive metal, i.e., copper or copper alloy, as well as aluminum or aluminum alloy. The above covering part 14 is composed of synthetic resin such as polyvinylchloride, PVC, or polyolefin (PE or PP).

The mating connector 15 is provided with a female terminal 16 as a mating terminal fixture connected with the core wire 13 exposed out of the covering part of the electric wire 12, a mating housing 19 attached to the covering part 14 of the electric wire 12 and laying the female terminal 16. The mating connector 15 is inserted into inside the receiving part 10*a* of the connector 3. The terminal 8 of the male terminal 7 is inserted into inside the female terminal 16 so that these terminals 7, 16 are electrically connected with each other.

The female terminal 16 is obtained by stamping or bending a conductive plate. The female terminal 16 is provided with a electric contact 17 connected with the male terminal 7, and an electric wire connection 18 extending to the electric contact 17 to be attached to the core wire 13.

Figure 5A:
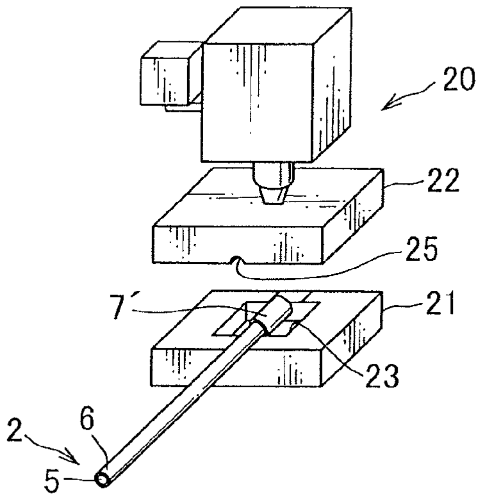
FIG. 5A is a perspective view illustrating a state that an electric wire is placed in a first cavity.
Figure 5B:
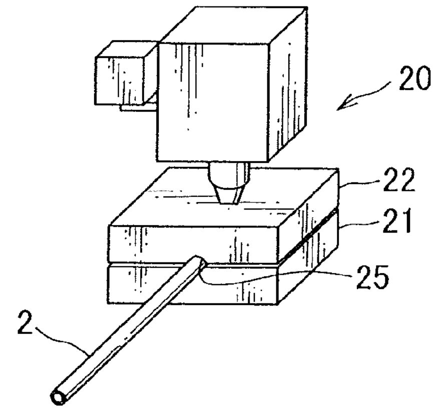
FIG. 5B is a perspective view illustrating a state that a second cavity is approached to the first cavity.
Figure 5C:
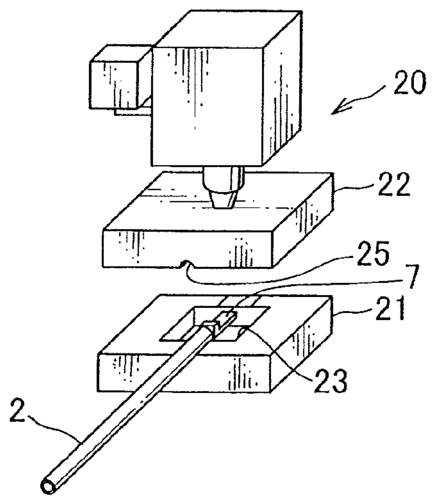
FIG. 5C is a perspective view illustrating a state that the second cavity is separated from the first cavity.

Then, a press machine 20 manufacturing the male terminal 7 connected with the aforementioned aluminum electric wire 2 will be explained with reference to FIGS. 5A to 5C. The press machine 20, as shown in FIGS. 5A to 5C, is composed of a first mold 21 and a second mold 22.

The first mold 21 is formed in, e.g., a rectangular shape, which is provided with a press recess 23 formed concave from its upper face (a face overlaid with the second mold 22), and a groove (not shown) placed on the covering part of the aluminum electric wire 2. The press recess 23 is formed in the same shape as the male terminal 7. The press recess 23 is also provided with a flat first bottom (not shown), and a flat second bottom (not shown) extending to the first bottom and formed in a concave shape from the first bottom.

The second mold 22 is formed in, e.g., a rectangular shape and is provided with a press projection formed convex from the face of the second mold 22 overlaid with the upper face and engaging with the press recess 23 of the first mold 21, and a second groove 25 located at a position opposite to the not-shown groove of the first mold 21 and formed concave from the face overlaid with the upper face. The press projection is provided with a first projection opposite to the first bottom of the press recess 23, and a second projection opposite to the second bottom. The first projection is formed more convex than the second projection.

Figure 6A:
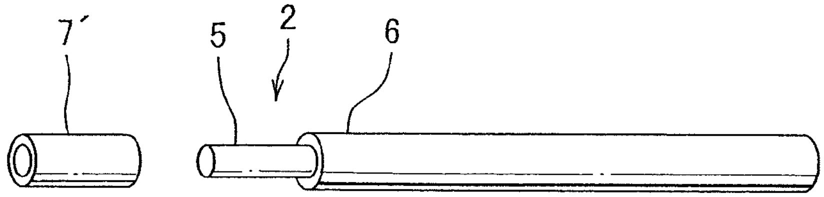
FIG. 6A is a perspective view illustrating a state that a pipe member is inserted into a core wire of the electric wire, for showing a method for manufacturing the wire harness in FIG. 1.
Figure 6B:
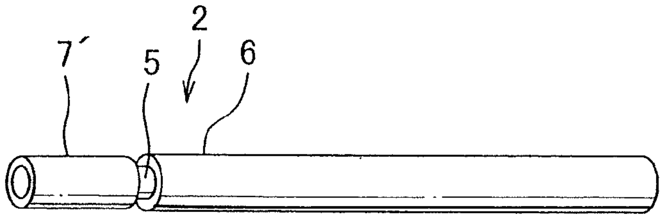
FIG. 6B is a perspective view illustrating a state that the electric wire is positioned inside the pipe member.
Figure 6C:
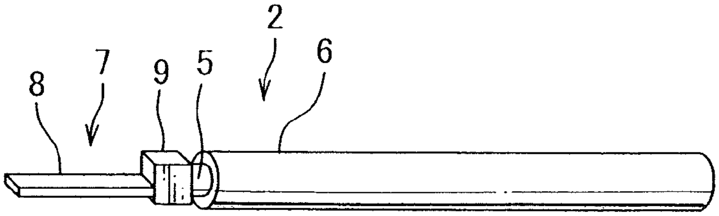
FIG. 6C is a perspective view illustrating a state that a male terminal is attached to the core wire of the electric.
Figure 6D:
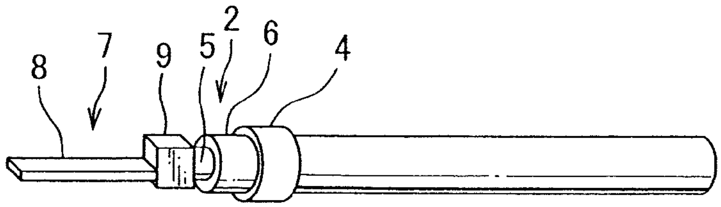
FIG. 6D is a perspective view illustrating a state that a waterproof member is attached to a covering part of the electric wire.

Then a method for forming the male terminal 7 connected with the aluminum electric wire 2 will be explained using the aforementioned press machine 20 with reference to FIGS. 5, 6. Firstly, as shown in FIG. 5A, the second mold 22 is moved in a direction away from the first mold 21. The core wire 5 exposed out of the aluminum electric wire 2 as shown in FIG. 6A, is then inserted into the aforementioned pipe member 7', which is then placed on the press recess 23 with the core wire 5 exposed out of the aluminum electric wire 2 inside the aforementioned pipe 7' as shown in FIG. 6B, and the covering part 6 of the aluminum electric wire 2 is placed on the groove. Secondly, the second mold 22, as shown in FIG. 5B, is approached to the first mold 21 to press the pipe 7' (namely pressing with the core wire 5 being positioned inside the pipe member 7'). Lastly, after predetermined time under pressing, the second mold 22 is moved away from the first mold 21. The male terminal 7 having the terminal 8 and the connection part 9, as shown in FIG. 6C, is thus formed (corresponding to the first process).

Figure 7A:
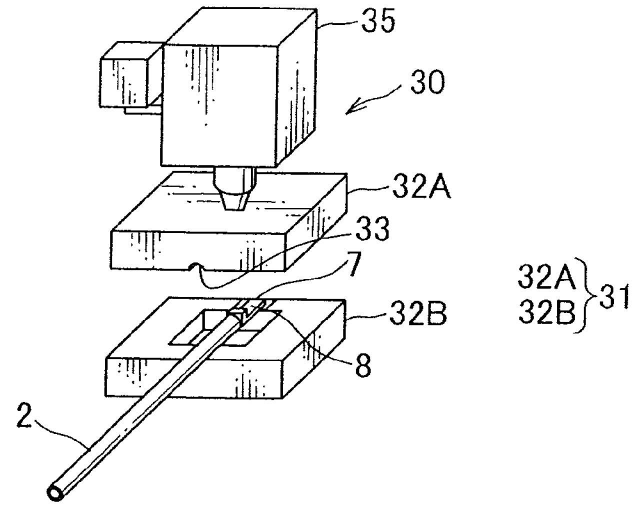
FIG. 7A is a perspective view illustrating a state that the electric wire is placed in a cavity, for showing an operation of a first injection molding machine for molding the waterproof member to the covering part of the electric wire.
Figure 7B:
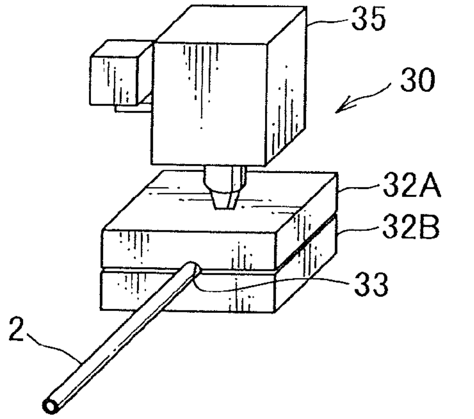
FIG. 7B is a perspective view illustrating a state that a pair of cavities is approached to each other.

Next, a first injection molding machine 30 molding by injection molding the waterproof member 4 to the aluminum electric wire 2 attached to the male terminal 7 will be explained with reference to FIGS. 7A to 7C. The first injection molding machine 30, as shown in the above figures, is composed of a mold part 31 having a cavity (not shown), and a injection 35 injecting a plasticized mold material into the cavity.

The mold part 31 is provided with a pair of molds 32A, 32B. A cavity and an injection hole (not shown) extending to the cavity are disposed between the pair of molds 32A, 32B, from which the injection outlet 35 plasticized mold material is injected. The mold 32A is formed concavely from a face overlaid with the mold 32B, and disposed a groove (not shown) on which the covering part of the aluminum electric wire is placed. The mold 32B is also provided with a second groove 33 positioned opposite to not-shown groove of the mold 21A and formed concavely from a face overlaid with the mold 32A.

The cavity is a space disposed between the molds 32A, 32B when the aforementioned molds 32A, 32B approach to each other. The cavity is formed along an outline of the waterproof member 4 attached to the aluminum electric wire 2.

Next, a method for attaching the waterproof member 4 by injection molding to the aluminum electric wire 2 will be explained using the aforementioned first injection molding machine 30 with reference to FIGS. 6A to 6D, and FIGS. 7A to 7C. The pair of molds 32A, 32B, as shown in FIG. 7A, is moved away from each other before the covering part 6 of the aluminum electric wire 2 is positioned in the cavity. The pair of molds 32A, 32B is approached to each other.

Figure 7C:
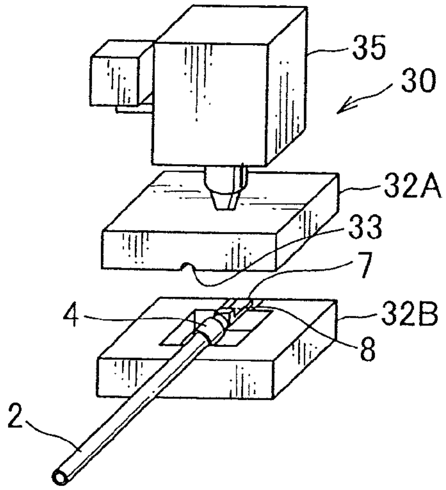
FIG. 7C is a perspective view illustrating a state that the pair of cavities is separated from each other.

Furthermore, a heated and fluidized (plasticized) elastomer (mold material) is injected by high pressure into cavity of the mold part 31, and after cooled and solidified or cured in the cavity the pair of molds 32A, 32B, as shown in FIG. 7C, is moved away from each other. The waterproof member 4 is attached by injection molding to the covering part 6 of the aluminum electric wire 2 to which the male terminal 7 has been attached (corresponding to a second process).

Figure 8A:
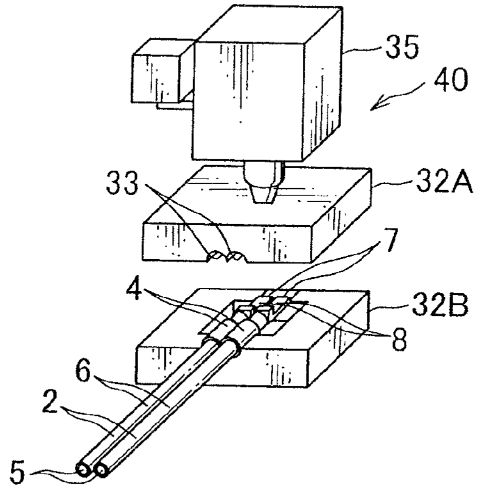
FIG. 8A is a perspective view illustrating a state that the electric wire is placed in a cavity, for showing an operation of a second injection molding machine for molding the housing to electric wire.
Figure 8B:
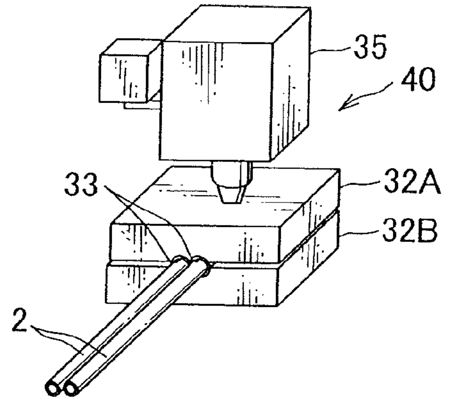
FIG. 8B is a perspective view illustrating a state that a pair of cavities is approached to each other.

Next, a second injection molding machine 40 for molding the housing 10 by injection molding to the aluminum electric wire 2 to which the male terminal 7 is attached and the waterproof member 4 attached to the aluminum electric wire 2 will be explained with reference to FIGS. 8A to 8C. It should be noted that the same parts of the first injection molding machine 30 is added with the same reference number, of which explanation is abbreviated. The cavity is formed along an outline of the aforementioned housing 10.

Next, a method for attaching the housing by injection molding to the aluminum electric wire 2 and the waterproof member 4 attached to the aluminum electric wire 2 will be explained using the aforementioned second injection molding machine 40 with reference to FIGS. 8A to 8C. The pair of molds 32A, 32B is, as shown in FIG. 8A, moved away from each other before the aluminum electric wire 2 to which the male terminal is attached and the waterproof member attached to the aluminum electric wire 2 are plurally laid (two wires with an illustrated example), and as shown in FIG. 8B a part of the connection 9 of the male terminal 7, the aluminum electric wire 2, and the waterproof member 4 attached to the aluminum electric wire 2 are positioned in the cavity. The pair of molds 32A, 32B is approached to each other.

Figure 8C:
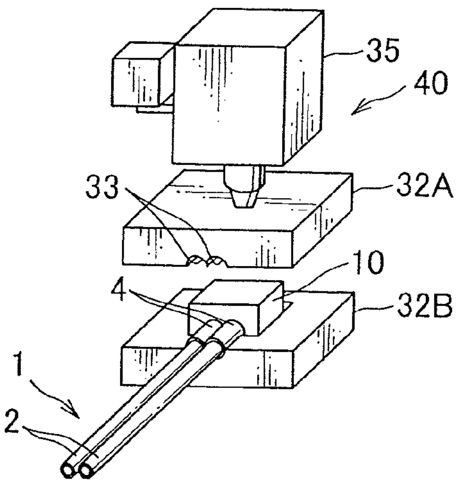

Furthermore, a heated and fluidized (plasticized) resin such as polyethylene or polypropylene (mold material) is injected by high pressure into cavity of the mold part 31, and the pair of molds 32A, 32B, as shown in FIG. 8C, is, after cooled and solidified or cured in the cavity, moved away from each other. The housing 10 is thus attached to the aluminum electric wire 2 and the waterproof member 4 attached to the aluminum electric wire 2 (corresponding to a third process). The wire harness 1 has thus been completed.

According to the above-mentioned embodiment, between the housing 10 and the covering part 6 the ring-shaped waterproof member 4 filling the gap therebetween is disposed, and the waterproof member 4 is composed of soft resin, so that it is made possible that the connection part of the core wire 5 and the male terminal 7 may not watered without employing the conventional waterproof sealant 101*a*, leading to improvement of productivity and reduction of cost, providing of the wire harness capable of securing reliability by enhancing the waterproof performance and the method for manufacturing the wire harness.

Furthermore, since the core wire 5 is made of aluminum, it is made possible to reduce weight of the wire harness. In addition, since the connection portion between the core wire and the male terminal 7 is made to be watered unlikely, it is made possible to contain inducement of corrosion in the core wire.

Furthermore, since the male terminal 7 includes the terminal 8 connected with a mating female terminal 16, a connection part 9 extending to the terminal 8 and connected with the core wire 5, and the terminal 8 and the connection part 9 are formed together by press working with the core wire 5 inside the pipe member 7' as a cylindrical member made of conductive metal, it is made possible to form the terminal 8 and the connection part 9 together without forming them separately, resulting in improvement of productivity and reduction of cost.

Furthermore, since the waterproof member 4 is formed integral with the covering part 6 by injection molding, it is made possible to reduce work for attaching the waterproof sealant 4 to outside the covering part 6, resulting in improvement of productivity and reduction of cost as well as further enhancement of the waterproof performance on account of maintaining waterproofed without any gap between the waterproof sealant 4 and the covering part 6.

Furthermore, since the waterproof member 4 and the aluminum electric wire 2 (the covering part 6), in the manufacturing process for the wire harness, are separately (in other parts) provided, the waterproof member 4 and the aluminum electric wire 2, when attaching the waterproof member 4 to the aluminum electric wire 2, are given respective part numbers so as to be separately managed, it is made possible not to control inventory of the waterproof member 4 by giving only one part number to the aluminum electric wire 2 because of the waterproof member 4 being formed integral with the covering part 6 by injection molding, and enable production of the waterproof member 4 according to its demand so as to eliminate unnecessary inventory and dead storage, resulting in further reduction of cost. Furthermore, since the waterproof member 4 is formed integral with the covering part 6 of the aluminum electric wire 2 by injection molding, it is made possible to reduce logistic cost for transporting the waterproof member 4 from components factory to assembly factory manufacturing the wire harness 1, resulting in further reduction of cost.

Furthermore, since the housing 10 is formed by injection molding integral with the aluminum electric wire 2 and the waterproof member 4 attached to the covering part 6 of the aluminum electric wire 2, it is made possible to reduce work for attaching the housing 10 to the aluminum electric wire 2 and the waterproof member 4 attached to the aluminum electric wire 2, as a result of which allows further reduction of cost, and enhances the waterproof performance on account of maintaining waterproofed without any gap among the housing 10, the aluminum electric wire 2, and the waterproof member 4 attached to the aluminum electric wire 2, leading further improvement of waterproof performance.

Furthermore, since the housing 10, the aluminum electric wire 2, and the waterproof member 4 attached to the aluminum electric wire 2, in the manufacturing process for the wire harness, are separately provided, and the housing 10, the aluminum electric wire 2, and when attaching the housing 10 to the aluminum electric wire 2 and the waterproof member 4 attached to the aluminum electric wire 2, the waterproof member 4 attached to the aluminum electric wire 2 are given respective part numbers so as to be separately managed, it is made possible not to control inventory of the waterproof member 4 by giving only one part number to the housing 10 attached to the aluminum electric wire 2 and the waterproof member 4 attached to the aluminum electric wire 2 because of the housing 10 being formed integral with the aluminum electric wire 2 and the waterproof member 4 attached to the aluminum electric wire 2 by injection molding, and enable production of the waterproof member 10 according to its demand so as to eliminate unnecessary inventory and dead storage, resulting in further reduction of cost. Furthermore, it is made possible to reduce logistic cost for transporting the housing 10 from components factory to assembly factory manufacturing the wire harness, resulting in further reduction of cost.

Figure 9A:
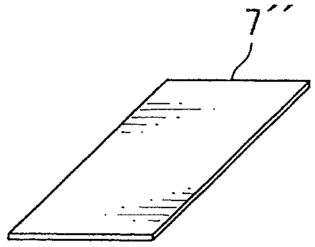
FIG. 9A is a perspective view illustrating a state that a metal plate composing the male terminal attached to the electric wire is shown, for showing other method for molding the wire harness shown in FIG. 1.
Figure 9B:
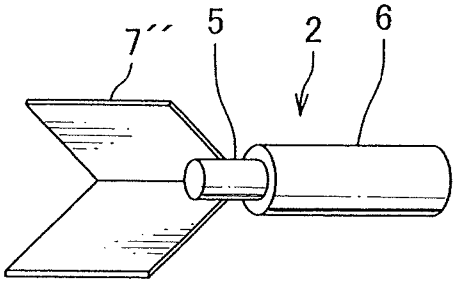
FIG. 9B is a perspective view illustrating a state that the core wire of the electric wire is sandwiched between the metal plates.
Figure 9C:
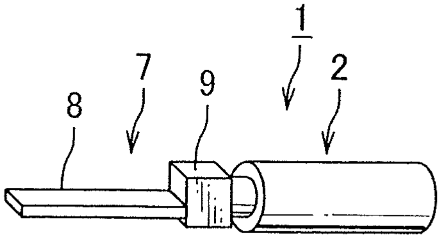
FIG. 9C is a perspective view illustrating a state that the male terminal is attached to the core wire of the electric wire.
Figure 10A:
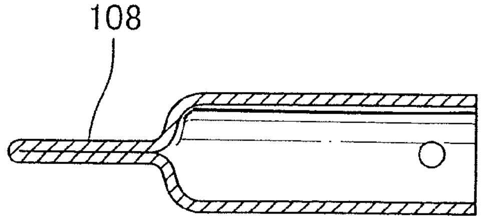
FIG. 10A PRIOR ART
FIG. 10A is a cross-sectional view illustrating a state that one end of a pipe member is swaged to form a terminal, for showing a conventional method for molding the wire harness.
Figure 10B:
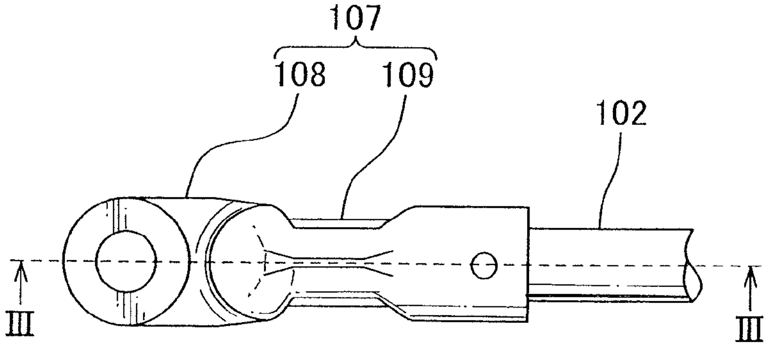
FIG. 10B PRIOR ART
FIG. 10B is a plan view illustrating a state that a middle of the pipe member is swaged to form a connection portion.
Figure 10C:
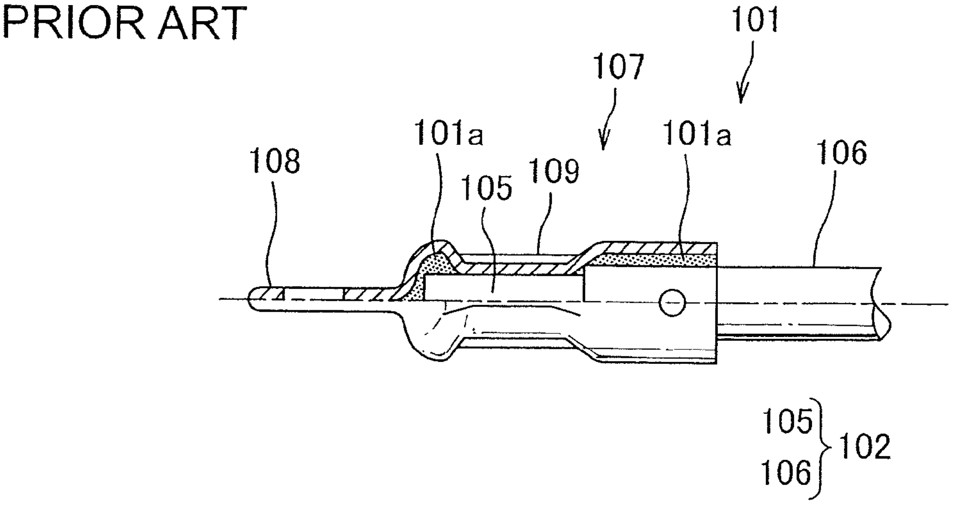
FIG. 10C PRIOR ART
FIG. 10C is a plan view illustrating a partial cross-section along III to III in FIG. 10B.

It is should be noted that in the aforementioned embodiment although the male terminal 7 is obtained by means of inserting the core wire 5 exposed out of the covering part 6 of the aluminum electric wire 2 into a pipe member 7' made of copper or copper alloy as a tubular member, and forming by press working while the core wire 5 is positioned inside the pipe member 7', the present invention is not intended to be limited therewithin, and that, as shown in FIGS. 9A to 9C, after the core wire 5 is placed on a metal plate 7" made of copper or copper alloy, the metal plate 7" is, as shown in FIG. 9B, folded in such a manner as to sandwich the core wire 5, and pressed with the core wire 5 being sandwiched between the metal plates 7". Namely, pressing the core wire 5 with the core wire 7' being sandwiched between the metal plates 7' may, as shown in FIG. 9C, form the male terminal 7 as a terminal fixture. In FIG. 9C, the same reference number is added to the same parts of the aforementioned embodiment, of which explanation is abbreviated.

According to the aforementioned embodiment, the male terminal 7 is provided with the terminal 8 connected with the mating male terminal 7, and the connection part 9 extending to the connection part 8 and connected with the core wire 5, and after the core wire 5 is placed on a metal plate 7" made of copper or copper alloy, the metal plate 7" is folded in such a manner as to sandwich the core wire 5, and is pressed while the core wire 5 is sandwiched between the metal plates 7" so as to be formed together, leading to further improvement of productivity and reduction of cost because of forming the terminal 8 and the connection part 9 together without forming them separately.

In the aforementioned embodiment, although the wire harness 1 is provided integral with two aluminum electric wires 2 and two waterproof members each attached to the aluminum electric wires 2 by the housing 10, the present invention is not intended to be limited therewithin, the wire harness 1 is thus provided integral with two or more aluminum electric wires 2 and two or more waterproof members each attached to the aluminum electric wires 2 by the housing 10.

In the aforementioned embodiment, although the male terminal 7 as a terminal fixture is composed of copper or copper alloy, the present invention is not intended to be limited therewithin, the male terminal 7 is thus composed of alloy in which magnesium or iron is added to enhance conductivity, strength or flexibility, besides copper or copper alloy.

In the aforementioned embodiment, although the core wire 5 is composed of aluminum, the present invention is not intended to be limited therewithin, the core wire 5 is thus composed of a plurality of twisted element wires made from flexible copper wires. Namely, the core wire 5 may be composed of copper or copper alloy. According to the abovementioned embodiment, since the waterproof member 4 is disposed, it is made possible that the connection portion of the core wire 5 and the male terminal 7 made of copper or copper alloy may not be watered, leading to further improvement of productivity and reduction of cost along with securement of reliability because of enhancement of waterproof performance.

Since the embodiment mentioned above shows nothing more than a typical configuration of the present invention, it is not intended to be limited within the embodiment. Namely, it is to be understood that various changes and modifications will be made without, however, departing from the spirit of the present invention.

What is claimed is:

1. A wire harness comprising:

an electronic wire having a core wire and a covering part covering the core wire;

a terminal fixture attached to the core wire exposed out of the covering part of the electric wire;

a housing attached to the covering part and formed to lay the terminal fixture therein; and a waterproof member formed in a ring shape between the housing and the covering part so as to fill a gap therebetween, the waterproof member being made of soft resin, Wherein the waterproof member is integrally molded with the housing and the covering part by injection molding.

2. The wire harness as claimed in claim 1, wherein the core wire is made of aluminum.

3. A method for manufacturing the wire harness recited in claim 2, comprising the steps of:

attaching the core wire exposed out of the covering part of the electric wire to the terminal fixture;

attaching the waterproof member to an outside of the covering part while the core wire is attached to the terminal fixture;

attaching the housing to an outside of the waterproof member while the waterproof member is attached to the outside of the covering part.

4. The method for manufacturing the wire harness as claimed in claim 3, wherein the terminal fixture includes a terminal connected with a mating terminal fixture, and a connection part extending to the terminal and connected with the core wire, the method further comprising:

forming the terminal and the connection part together by press working with the core wire inside a cylindrical member made of conductive metal.

5. The method for manufacturing the wire harness as claimed in claim 3, wherein the terminal fixture includes a terminal connected with a mating terminal fixture, and a connection part extending to the terminal and connected with the core wire, the method further comprising:

placing the core wire on a conductive metal plate;

folding the metal plate so as to sandwich the core wire; and forming the terminal and the connection part together by press-working of the sandwiched metal plate.

6. The method for manufacturing the wire harness as claimed in claim 3, wherein the waterproof member is formed by injection molding integral with the covering part.

7. The wire harness as claimed in claim 1, wherein the core wire is made of copper.

8. A method for manufacturing the wire harness recited in claim 7, comprising the steps of:

attaching the core wire exposed out of the covering part of the electric wire to the terminal fixture;

attaching the waterproof member to an outside of the covering part while the core wire is attached to the terminal fixture;

attaching the housing to an outside of the waterproof member while the waterproof member is attached to the outside of the covering part.

9. The method for manufacturing the wire harness as claimed in claim 8, wherein the terminal fixture includes a terminal connected with a mating terminal fixture, and a connection part extending to the terminal and connected with the core wire, the method further comprising:

forming the terminal and the connection part together by press working with the core wire inside a cylindrical member made of conductive metal.

10. The method for manufacturing the wire harness as claimed in claim 8, wherein the terminal fixture includes a terminal connected with a mating terminal fixture, and a connection part extending to the terminal and connected with the core wire, the method further comprising:

placing the core wire on a conductive metal plate;

folding the metal plate so as to sandwich the core wire; and forming the terminal and the connection part together by press-working of the sandwiched metal plate.

11. A method for manufacturing the wire harness recited in claim 1, comprising the steps of:

attaching the core wire exposed out of the covering part of the electric wire to the terminal fixture;

attaching the waterproof member to an outside of the covering part while the core wire is attached to the terminal fixture;

attaching the housing to an outside of the waterproof member while the waterproof member is attached to the outside of the covering part.

12. The method for manufacturing the wire harness as claimed in claim 11, wherein the terminal fixture includes a terminal connected with a mating terminal fixture, and a connection part extending to the terminal and connected with the core wire, the method further comprising:

forming the terminal and the connection part together by press working with the core wire inside a cylindrical member made of conductive metal.

13. The method for manufacturing the wire harness as claimed in claim 12, wherein the waterproof member is formed by injection molding integral with the covering part.

14. The method for manufacturing the wire harness as claimed in claim 12, wherein the housing is formed by injection molding integral with the electric wire and the waterproof member attached to the covering part of the electric wire.

15. The method for manufacturing the wire harness as claimed in claim 11, wherein the terminal fixture includes a terminal connected with a mating terminal fixture, and a connection part extending to the terminal and connected with the core wire, the method further comprising:

placing the core wire on a conductive metal plate;

folding the metal plate so as to sandwich the core wire; and forming the terminal and the connection part together by press-working of the sandwiched metal plate.

16. The method for manufacturing the wire harness as claimed in claim 15, wherein the waterproof member is formed by injection molding integral with the covering part.

17. The method for manufacturing the wire harness as claimed in claim 15, wherein the housing is formed by injection molding integral with the electric wire and the waterproof member attached to the covering part of the electric wire.

18. The method for manufacturing the wire harness as claimed in claim 11, wherein the waterproof member is formed by injection molding integral with the covering part.

19. The method for manufacturing the wire harness as claimed in claim 11, wherein the housing is formed by injection molding integral with the electric wire and the waterproof member attached to the covering part of the electric wire.

20. The wire harness as claimed in claim 1, wherein the terminal fixture includes a terminal connected with a mating terminal fixture, and a connection part extending to the terminal and connected with the core wire, and wherein a part of the connection part is integrally molded with the housing by insert molding.

* * * * *